Apr. 17, 1923.
K. S. GINGERICK
1,451,769
TRACTION WHEEL
Filed May 1, 1922
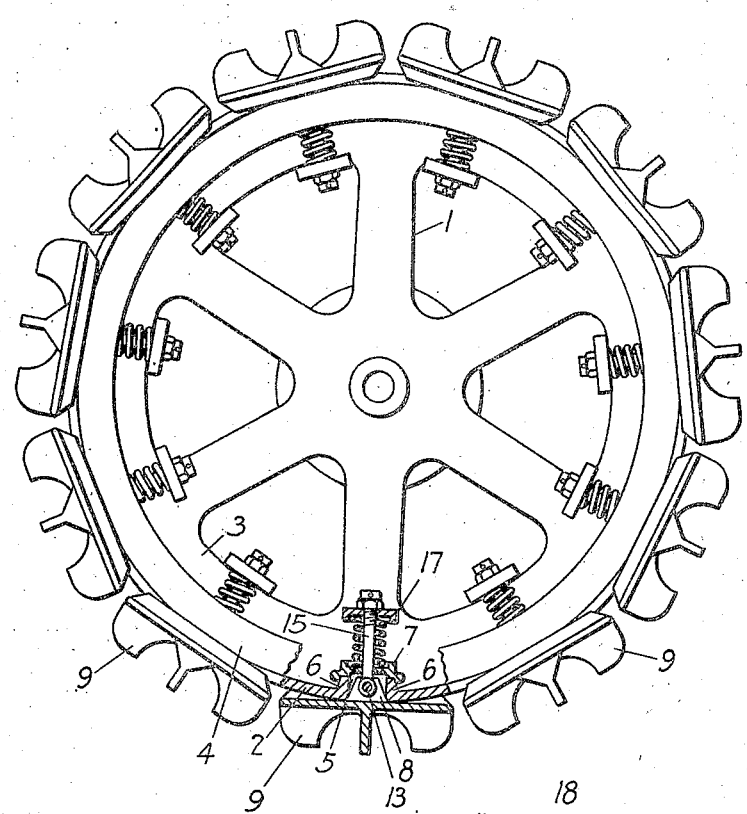
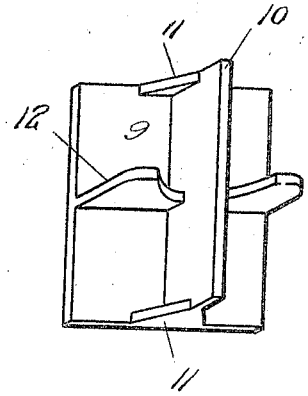
Fig. 3.
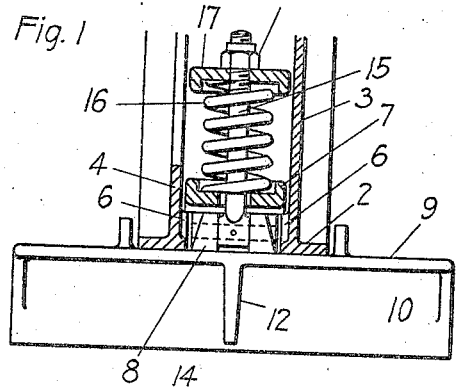
Fig. 1
Fig. 2
INVENTOR,
Kent S. Gingerich,
BY
Horace S. Smith
ATTORNEYS.

UNITED STATES PATENT OFFICE.

KENT S. GINGERICK, OF URBANA, OHIO, ASSIGNOR TO RIAL T. PARRISH, OF DAYTON, OHIO.

TRACTOR WHEEL.

Application filed May 1, 1922. Serial No. 557,524.

*To all whom it may concern:*

Be it known that I, KENT S. GINGERICK, a citizen of the United States, residing in the city of Urbana, in the county of Champaign and State of Ohio, have invented certain new and useful Improvements in Tractor Wheels, of which the following is a specification.

The principal object of my invention is to provide means for attaching pads, cleats or other traction members to the outer peripheral portion or rim of a tractor wheel, independently of the central hub portion, in a manner which will permit them to move or oscillate circumferentially as the wheel traverses the ground, thus providing a continuously smooth pad or track over which the rim of the wheel may roll.

In the accompanying drawings, Figure 1 is a side elevational view of a tractor wheel equipped with my improved oscillating cleats. Figure 2 is an end view, partly in section, of the means for securing the oscillating cleats to the rim of the wheel. And Figure 3 is a perspective view of one of said cleats.

Throughout the specification and drawings, similar reference characters denote corresponding parts.

Referring to the accompanying drawings for a detailed description of the embodiment of my invention illustrated therein, the numeral 1 designates a rear or driving tractor-wheel provided with a rim 2. The latter comprises an inner flanged circular portion 3 and an outer flanged circular portion 4 of less width than the portion 3. (See Figures 1 and 2.)

Spaced an equal distance apart around the portions 3 and 4 of the rim 2, are holes 5 in the latter. Lugs 6 are formed on these portions 3 and 4 of the rim around each hole 5, to support a cupped spring-retaining member 7. (See Figures 1 and 2.)

Adapted to be received by each hole 5, is a pair of lugs 8, 8 on the rear part of a cleat 9. Each cleat preferably comprises a casting having a flat top from which there projects downwardly at right angles thereto, a flat ground engaging part 10. The latter is suitaby reinforced by integral side pieces 11, 11 and an integral rib portion 12 that has a concave middle part. (See Figures 1, 2 and 3.) While I have shown this form of cleat or ground engaging member, any other form of cleat of the same general type may be employed if desired.

Pivotally secured between the lugs 8, 8 on each cleat 9 by a transverse pin 13, is the eye portion 14 of an eye bolt 15. Surrounding this bolt beyond the retainer 7, and pressing against the latter, is a coiled spring 16 whose inner end is received by an inverted cup 17, the tension of which against said spring is adjusted by a nut 18 on the inner end of the bolt. (See Figures 1 and 2.)

As soon as the end of a cleat 9 nearest the ground comes into engagement with it during the revolution of the tractor wheel 1, it will flatten out upon the ground against the tension of the spring 16. Thus two cleats are in flexible contact with the ground during the greater part of the travel of the wheel 1. This is due to the fact that so soon as one portion of a cleat contacts with the ground, the pressure of it thereon will cause the cleat to act as a lever against one of the lugs 6 and a fulcrum, to draw the other end of the cleat down to the ground against the tension of the spring 16. And as soon as the cleat leaves the ground, this spring will press outwardly against the cup 17 with sufficient force to draw the cleat, by means of the eye bolt 15, to the tangential position which it normally occupies. These cleats are thus free to oscillate on the rim of the wheel to readily accommodate themselves to that position on the ground which will enable them speedily to come to the best traction position thereon, and to maintain that position throughout a substantial part of the travel of the tractor wheel.

Having described my invention, I claim:

1. In a device of the type described, the combination with a rim having a plurality of holes in its periphery, of a traction member having a pair of lug portions adapted to enter each hole for oscillation therein, an inwardly projecting element pivotally secured at its lower end between said lugs, a spring-support mounted on said rim over each hole, a coil spring encircling said element and bearing against said support, and a cap on the inner end of said element to receive the inner end of said spring.

2. In a device of the type described, the combination with a rim having an inner and an outer flanged portion, said rim having holes in its periphery, inwardly projecting lugs on said flanged portions around each hole, a cleat having a pair of lug portions adapted to enter each hole for oscillation therein, an eye bolt having its eye end between said lug portions, a pin projecting from the latter through the eye end of said bolt, a cupped member mounted on the inwardly projecting lugs of the flanged portions of the rim, a coil spring supported by said cupped member, encircling said eye bolt, and an inverted cup on the inner end of said bolt against which said spring bears to draw the cleat against the flanged portion of the rim, for the purpose specified.

In testimony whereof I have hereunto set my hand this 21st day of April, 1922.

KENT S. GINGERICK.

Witness:
HOWARD S. SMITH.